United States Patent [19]

Nasser, Jr.

[11] 3,951,933

[45] Apr. 20, 1976

[54] PRODUCTION OF HYDROGENATED ETHYLENE POLYMERS USING CHROMIUM-CONTAINING CATALYST

[75] Inventor: Benny E. Nasser, Jr., Bartlesville, Okla.

[73] Assignee: Phillips Petroleum Company, Bartlesville, Okla.

[22] Filed: Sept. 30, 1974

[21] Appl. No.: 510,459

[52] U.S. Cl. .............................. 526/25; 260/96 HY; 526/48; 526/348; 526/352
[51] Int. Cl. .............................................. C08f 27/25
[58] Field of Search ............... 260/94.9 G, 94.9 EP, 260/88.25; 450/613, 613.5

[56] References Cited
UNITED STATES PATENTS

| | | | |
|---|---|---|---|
| 3,415,898 | 12/1968 | Walker | 260/94.9 X |
| 3,475,399 | 10/1969 | Peters et al. | 260/93.7 |

*Primary Examiner*—William F. Hamrock

[57] ABSTRACT

Ethylene or ethylene plus a higher 1-olefin comonomer is polymerized in a solution system utilizing a catalyst comprising a silicon-containing support, a chromium compound, and a Group VIII metal and thereafter any excess monomer is removed and hydrogen introduced to lower the unsaturation of the polymer.

15 Claims, No Drawings

PRODUCTION OF HYDROGENATED ETHYLENE POLYMERS USING CHROMIUM-CONTAINING CATALYST

BACKGROUND OF THE INVENTION

This invention relates to the polymerization of ethylene to form ethylene polymers including both homopolymers and copolymers of ethylene and a higher 1-olefin using a chromium-containing catalyst. Supported chromium-containing catalyts can be used to prepare ethylene polymers and copolymers in a hydrocarbon solution as is well known in the art. Such polymers generally have a small amount of unsaturation. Even when hydrogen is utilized during polymerization for molecular weight control, hydrogen acts primarily as a chain-transfer agent and hence significant hydrogenation of the polymer does not occur in the presence of the olefin monomer. While polymers produced from conventional systems have excellent characteristics and have found wide utility in the art, the presence of unsaturation does have an unfavorable effect on certain properties such as dielectric loss at high frequencies and high temperature stability. The relationship of unsaturation to stability is disclosed in Hogan, U.S. Pat. No. 3,513,152.

SUMMARY OF THE INVENTION

It is an object of this invention to polymerize ethylene to form homopolymers and copolymers having improved characteristics utilizing a chromium-containing catalyst;

it is a further object of this invention to utilize a single catalyst system for the polymerization of the monomers and subsequent hydrogenation of ethylene polymers and copolymers;

it is yet a further object of this invention to provide ethylene polymers and copolymers having improved stability and lower dielectric loss at high frequencies; and it is still yet a further object of this invention to provide a simplified polymerization process for producing ethylene polymers and copolymers having low unsaturation.

In accordance with this invention, ethylene or ethylene plus a higher 1-olefin comonomer is polymerized over a chromium-containing catalyst on a silicon-containing support having therein in addition a Group VIII metal compound, after which polymerization hydrogen is introduced in the substantial absence of ethylene to effect at least partial hydrogenation of the polymer.

DESCRIPTION OF THE PREFERRED EMBODIMENTS

The catalysts used for practicing this invention comprise a silicon-containing support containing a chromium-containing compound and a Group VIII metal compound.

The silicon-containing support can be silica, silica-alumina, silica-titania, and the like. These supports are particulate in nature and they can be prepared by precipitation and coprecipitation techniques or by mixing silica with other refractory materials. For example, sodium silicate can be added to an acid such as sulfuric acid, the resulting precipitate aged for at least one hour, water-soluble salts removed by washing with water, and then the water removed by azeotropic distillation with a normally liquid oxygen-containing organic compound such as ethyl acetate. Silica generally constitutes a major portion of the support with other metal compounds (exclusive of the chromium and Group VIII metal) when used making up from 0.1 to about 20 weight percent of the finished catalyst.

The chromium compound and the Group VIII metal compound can be incorporated into the silica by impregnating silica with a solution of the respective compounds or one or both of these compounds can be coprecipitated with the silicon-containing support. In a preferred embodiment the Group VIII metal (nickel) and the silicon-containing support are prepared by coprecipitation. This is carried out simply by mixing an alkali metal silicate with an acid containing a dissolved nickel compound such as nickel sulfate. The resulting cogel is washed, chromium added in the form of a water-soluble chromium compound such as chromium trioxide or chromium nitrate and the resulting cogel dried by azeotropic distillation with an oxygen-containing organic compound having some water solubility such as ethyl acetate. Alternatively, chromium is added to the dried cogel by impregnation with a nonaqueous solution of an organochromium compound such as tertiary butyl chromate. In yet another embodiment, the support is impregnated with a soluble Group VIII metal and a soluble chromium compound either sequentially in any order, or in combination to form the composite. The metal compounds used in the impregnation can either be water-soluble compounds which are preferably added prior to drying the hydrogel or hydrocarbon-soluble compounds which are preferably added to the xerogel formed by removing water from the hydrogel. A two-step impregnation process can be employed, for example in which the support is treated with an aqueous solution such as nickel nitrate and dried and the dry composite is impregnated with a nonaqueous solution of tertiary butyl chromate. Conversely, the chromium can be added first and the Group VIII metal compound last.

The amount of Group VIII metal contained in the support can range from about 0.1 to about 10 weight per cent, preferably from about 1 to 8 weight per cent, based on the weight of the final dry composite of support, chromium compound, and Group VIII metal compound. The amount of chromium is generally in the range of 0.1 to 10, preferably 0.5 to 4 weight per cent chromium based on the total weight of the composite.

Exemplary Group VIII metal compounds that can be used include cobaltous acetate, cobaltous nitrate, cobalt 2-ethylhexoate, cobalt acetylacetonate, iron 3,5-diisopropylsalicylate, nickel acetate, nickel formate, nickel nitrate, nickel sulfate, nickel 3,5-diisopropylsalicylate, platinic chloride, chloroplatinic acid, ammonium chloroplatinate, platinum aminoacetate, platinum diammine oxalate, palladium chloride, palladium nitrate, palladium dichlorodiamine, ruthenium trichloride, ruthenium nitrate, and the like. Nickel is the presently preferred Group VIII metal.

The supported catalysts are activated by calcining in dry air for 0.5–50 hours, preferably 2–20 hours at a temperature ranging from 500°–2000°F, more preferably 900°–1700°F. The catalyst is then cooled to about 500°–750°F and treated with a dry reducing atmosphere such as carbon monoxide or hydrogen for 0.1 to 25, preferably 0.5–5 hours. At the conclusion of this operation the carbon monoxide or hydrogen is purged from the activator with dry nitrogen and the catalyst is cooled and stored for use.

The polymers produced in accordance with this invention are produced in a solution process. Suitable solvents are those hydrocarbons having 3 to 12 carbon atoms per molecule, generally selected from paraffins, cycloparaffins and aromatics with the paraffinic hydrocarbons being more preferred. Preferred solvents include n-butane, isobutane, n-pentane, isopentane, n-hexane, n-heptane, 2,2,4-trimethylpentane, cyclopentane, cyclohexane, methylcyclohexane, n-dodecane, and mixtures thereof. Sufficient pressure is maintained to keep the reaction mixture in liquid phase. Generally pressure in the range of 0 to 2000 psig, preferably 50 to 750 psig is utilized. Temperature will generally range from 230° to 350°F at which temperature the polymer formed is at least substantially soluble in the reaction mixture.

The contacting of monomer or monomers with the catalyst can be effected by any of the techniques known in the art of solid catalysts. A convenient method is to suspend the catalyst in the liquid solvent and to agitate the reaction mixture, thus maintaining the catalyst as a solid suspension in the liquid solvent. Other known catalytic contacting methods such as fixed bed, fluidized bed, gravitating bed, etc. can also be used. Hydrogen can be used during the polymerization to modify the molecular weight of the polymers produced if desired, this being separate from the hydrogen introduced at a later stage in the process. Partial pressure of hydrogen when hydrogen is used during the polymerization can be within the range of 5 to 100 psig, preferably 10 to 50 psig.

The monomers polymerized in accordance with this invention are ethylene alone or ethylene plus a comonomer selected from mono-1-olefins containing 3 to 8 carbon atoms per molecule. Examples of 1-olefin comonomers include propylene, 1-butene, 1-hexene, 1-octene, and the like. A major portion of such copolymers is derived from ethylene and generally consists of 80–99, preferably 95–99 mole per cent of ethylene.

At the termination of the polymerization, the ethylene or the ethylene/1-olefin comonomer charge remaining in the reactor, if any, is all or at least substantially all vented. Subsequently hydrogen is charged to the reactor contents in a sufficient amount, for example, 50 to 1000 psig, more preferably 50 to 500 psig to insure that the hydrogenation reaction will take place smoothly and in as short a time as possible. Generally 0.05 to 10 hours, preferably 0.1 to 2 hours is ample for this contacting of the hydrogen in the substantial absence of ethylene to effect hydrogenation. The temperature will generally be about 5° below the polymerization temperature, that is about 225°–345°F since some temperature drop is experienced during venting of the unreacted monomer and it is not necessary to raise the temperature back up for the hydrogenation step. Thus, as a general rule, the hydrogenation temperature will be about 5 degrees below the polymerization temperature, although the temperatures can be the same or greater, the polymer being all or at least substantially all in solution during the hydrogenation.

In instances where the Group VIII metal compound is not incorporated into the silicon-containing support by means of coprecipitation, a supplementary organometal or metal hydride compound dissolved in a hydrocarbon must be added to supplement the catalyst during the hydrogenation step. The organometal or metal hydride compound is a reducing metal compound represented by the formula $MR_n$ wherein M represents a metal of Group I-A, II-A or III-A of the Periodic System as shown on page B-2 of the Handbook of Chemistry and Physics, 45th edition, published by the Chemical Rubber Company in 1964, $n$ is the valence of the metal M, and each R is hydrogen or a hydrocarbyl radical having 1 to 20 carbon atoms such as alkyl, cycloalkyl, aryl or combinations thereof. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like.

This organometal or metal hydride compound can simply be added at the beginning of the hydrogenation step. In instances where the Group VIII metal compound is coprecipitated with the silicon-containing support, the catalyst from the polymerization can be used without any modification for the hydrogenation. However, even when the Group VIII metal compound is coprecipitated, an organometal or metal hydride compound can be utilized, if desired during the hydrogenation period. The organometal or metal hydride compounds presently preferred for this purpose are trialkyl aluminum compounds such as triethylaluminum or triisobutylaluminum. Dilute solutions of the organometal or metal hydride compound containing from 0.005 to 5 weight per cent can be utilized, preferably about 0.01 to 1 weight per cent. The molar ratio of organometal or metal hydride compound to Group VIII metal ranges from about 2:1 to 5:1, more preferably 2.5:1 to 3.5:1.

The hydrogenation is preferably carried out to an extent sufficient to reduce the overall unsaturation at least 10 per cent, preferably 20–95 per cent. Vinyl unsaturation is generally reduced at least 25, preferably 50 to substantially 100 per cent. Complete elimination of all unsaturation presumably would not be undesirable but is simply difficult to obtain as a practical matter.

After the hydrogenation step, the polymers are recovered conventionally. The polymers have enhanced thermal and oxidative stability because of their low unsaturation, hence they are usefully employed to form various articles by means of conventional fabrication techniques such as injection molding, extrusion, thermoforming, melt spinning, and the like. In applications involving wire coating where the dielectric properties are important, the polymer will generally have a melt index of about 0.1 to 1 so as to have a good balance of processing ease and environmental stress cracking resistance.

Thus, in accordance with this invention, a single catalyst can be used to polymerize ethylene polymers in one operation and then to hydrogenate the polymer with added hydrogen in a second operation, both operations taking place in the same reactor without removal of the liquid contents. As noted hereinabove, when the Group VIII metal compound is not coprecipitated, an organometal or metal hydride compound is added during the hydrogenation step and such a compound can be added in all instances.

EXAMPLE I

A commercially available microspheroidal silica containing about 0.1 weight per cent alumina and 1 weight per cent chromium substantially present as chromium oxide was slurried in an aqueous solution of nickel sulfate sufficient to give 3 weight per cent nickel based on the dry composite weight. The slurry was evaporated to dryness. The composite was activated by calcining it in dry air for 5 hours at 1300°F, cooled to 650°F, treated with dry carbon monoxide for one hour, purged with dry nitrogen and cooled. This was catalyst A.

Catalyst B was prepared in a manner similar to Catalyst A except that sufficient nickel sulfate solution was added to produce 5.7 weight per cent nickel based on the dry composite. The composite was activated by calcining it in dry air for 5 hours at 1300°F, cooled to 600°–650°F, treated with dry carbon monoxide for one hour, purged with dry nitrogen and cooled.

A silica/nickel hydrogel was prepared by adding 213 ml of Philadelphia Quartz Co. Type N water glass diluted with an equal quantity of water to a 12 weight per cent aqueous sulfuric acid solution containing dissolved nickel sulfate, with vigorous stirring at room temperature to obtain a hydrogel at pH 4.3 containing about 5 weight per cent silica. The silica contained 5 weight per cent nickel based on the dry cogel. The cogel was aged for 4 hours at 194°F, washed to remove soluble impurities with 0.5 weight per cent aqueous ammonium nitrate solution and impregnated with sufficient aqueous solution of chromium acetate to impart 1 weight per cent chromium based on the weight of the dry composite. The water was removed by azeotrope distillation with ethyl acetate. The dried composite was activated by calcining it in dry air for 5 hours at 1320°F, cooled to 620°F, treated with dry carbon monoxide for one hour, purged with dry nitrogen and cooled. This was Catalyst C.

Catalyst D was prepared in a manner similar to Catalyst C, except that the acid solution also contained dissolved chromium acetate sufficient to give 1 weight per cent chromium based on the weight of the dry composite. The resulting trigel was aged, washed and azeotrope dried with ethyl acetate in the manner of Catalyst C. It was activated by calcining it in dry air for 4½ hours at 1300°F, cooled to 620°F, treated with dry carbon monoxide for one hour, purged with dry nitrogen and cooled.

Ethylene homopolymer was prepared in each run in a stirred 1.3 liter reactor containing ¾ pound cyclohexane as solvent. The weight of catalyst charged ranged from 0.04 to 0.15 grams for the runs which amounts to 0.01–0.04 weight per cent based on reactor contents prior to starting polymerization. Reactor pressure was 450 psig, reactor temperature was 310°F, run length (about 30 minutes) was sufficient to make about 50–60 grams of polymer after which polymerization was terminated by venting the ethylene from the reactor. When triethylaluminum was added to activate the nickel component of the catalyst, it was added after venting the ethylene. The reactor was then pressured to about 450 psig with hydrogen. In the Table, MI means melt index of the polymer obtained as determined according to ASTM D 1238-62, condition E, TEA means triethylaluminum, $H_2$ means hydrogen, Ni means nickel, and the unsaturation of the polymer is expressed in terms of average vinyl (terminal) groups and trans (internal) groups per 1000 carbon atoms in the molecule.

Table 1

Two Stage Solution Polymerization of Ethylene and Hydrogenation of Ethylene Polymer

| Run No. | Catalyst No. | Wt.% Ni | H₂ Psig | Contact Time min. | Temp.°F | TEA Mole Ni Ratio | M.I. | Density g/cc | Vinyl/ 1000C | Trans/ 1000C |
|---|---|---|---|---|---|---|---|---|---|---|
| | | | | | | | | | Unsaturation | |
| 1 | A | 3 | None | NA[a] | NA | NA | 45.3 | 0.9680 | 1.2 | 0 |
| 2 | A | 3 | 450 | 60 | 306 | no TEA | 45.3 | 0.9681 | 1.2 | Trace |
| 3 | A | 3 | 460 | 60 | 306 | 3.4 | 46.5 | 0.9650 | 0.5 | 0.4 |
| 4 | B | 5.7 | 450 | 10 | 302 | 4.3 | 25.2 | 0.9667 | 0.5 | 0.2 |
| 5 | C | 5 | None | NA | NA | NA | 51.3 | 0.96[b] | 1.2 | 0 |
| 6 | C | 5 | 450 | 60 | 302 | no TEA | 47.3 | 0.9645 | 0.6 | 0.07 |
| 7 | C | 5 | 450 | 120 | 302 | 3.2 | 52.7 | 0.96 | 0.1 | 0.4 |
| 8 | D | 5 | 450 | 120 | 302 | 3.2 | 32.1 | 0.96 | 0.3 | 0.4 |

[a]Not applicable.
[b]Nominal 0.96 g/cc density, exact figure not determined.

Inspection of these data reveals that some hydrogenation of the polymer results, in the absence of TEA, providing nickel is coprecipitated with the catalyst support (run 6) as evidenced by the fact that the vinyl group content per 1000 carbon atoms of the polymer was reduced from 1.2 (control run 5) to 0.6 (run 6). Also, some isomerization was probably simultaneously occurring since traces of trans group content was now detected. Runs 1 and 2 show that nickel impregnated on a silica support does not give a catalyst capable of hydrogenation in the absence of TEA. When TEA is used to activate the nickel in such catalysts, the catalyst becomes capable of hydrogenating the terminal residual double bonds in the polymer chains as runs 3, 4 show. Isomerization is also occurring as the increase in trans group content shows. Runs 7 and 8 show that TEA also activates catalysts containing nickel incorporated in the support structure to substantially improve their hydrogenation capability. A considerable increase in trans group content is also observed which is consistent with runs 3 and 4. The estimation of unsaturation in terms of vinyl and trans groups per 1000 carbon atoms was made from infrared spectra of film samples pressed from each polymer.

While this invention has been described in detail for the purpose of illustration, it is not to be construed as limited thereby but is intended to cover all changes and modifications within the spirit and scope thereof.

What is claimed is:

1. In a process for producing ethylene polymer having low unsaturation, the improvement comprising:
    contacting an olefin monomer system comprising ethylene with an activated catalyst comprising a silicon-containing support containing a chromium compound and a Group VIII metal compound, said silicon-containing support and said Group VIII metal compound being coprecipitated;
    said contacting taking place in the presence of a hydrocarbon solvent at a temperature sufficient that at least substantially all of said polymer thus produced is dissolved;

thereafter venting substantially all of any olefin monomer remaining;

thereafter introducing hydrogen into said solvent containing said polymer dissolved therein and maintaining hydrogenation conditions thereon, said catalyst from said polymerization being present during said hydrogenation and serving as the sole catalyst therefor; and thereafter recovering said polymer having low unsaturation.

2. A method according to claim 1 wherein said monomer system consists essentially of ethylene.

3. A method according to claim 1 wherein said monomer system comprises ethylene and a comonomer selected from mono-1-olefins having 3 to 8 carbon atoms per molecule.

4. A method according to claim 1 wherein said Group VIII metal is nickel.

5. A method according to claim 1 wherein said catalyst containing said chromium and said Group VIII metal is calcined at a temperature within the range of 900°–1700°F for a time within the range of 2 to 20 hours and thereafter treated with a dry reducing medium.

6. A method according to claim 5 wherein said reducing medium is carbon monoxide and said treating is carried out at a temperature within the range of 550°–750°F for a time within the range of 0.5 to 5 hours.

7. A method according to claim 6 wherein said Group VIII metal is nickel, said monomer system consists essentially of ethylene, said solvent is cyclohexane, and said temperature during said polymerization is within the range of 230°–350°F.

8. In a process for producing ethylene polymer having low unsaturation, the improvement comprising:

contacting an olefin monomer system comprising ethylene with an activated catalyst comprising a silicon-containing support containing a chromium compound and a Group VIII metal compound; said contacting taking place in the presence of a hydrocarbon solvent at a temperature sufficient that at least substantially all of said polymer thus produced is dissolved;

thereafter venting substantially all of any olefin monomer remaining;

thereafter introducing triethylaluminum compound;

thereafter introducing hydrogen into said solvent containing said polymer dissolved therein and maintaining hydrogenation conditions thereon, said catalyst from said polymerization and said organometal or metal hydride compound being present during said hydrogenation; and thereafter recovering said polymer having low unsaturation.

9. A method according to claim 8 wherein said monomer system consists essentially of ethylene.

10. A method according to claim 8 wherein said monomer system comprises ethylene and a comonomer selected from mono-1-olefins having 3 to 8 carbon stoms per molecule.

11. A method according to claim 8 wherein said Group VIII metal is nickel.

12. A method according to claim 11 wherein said silicon-containing support and said nickel compound are coprecipitated.

13. A method according to claim 8 wherein said catalyst containing said chromium and said Group VIII metal is calcined at a temperature within the range of 900°–1700°F. for a time within the range of 2 to 20 hours and thereafter treated with a dry reducing medium.

14. A method according to claim 13 wherein said reducing medium is carbon monoxide and said treating is carried out at a temperature within the range of 550°–750°F. for a time within the range of 0.5 to 5 hours.

15. A method according to claim 14 wherein said Group VIII metal is nickel, said monomer system consists essentially of ethylene, said solvent is cyclohexane, and said temperature during said polymerization is within the range of 230°–350°F.

* * * * *